Patented Jan. 12, 1937

2,067,726

UNITED STATES PATENT OFFICE 2,067,726

WATER INSOLUBLE MONOAZO DYES

Heinrich Ohlendorf and Erich Baumann, Dessau in Anhalt, Germany, assignors to General Aniline Works, Inc., New York, N. Y., a corporation of Delaware No Drawing. Application July 10, 1935, Serial No. 30,735. In Germany August 11, 1934

12 Claims. (Cl. 260—38.5)

Our present invention relates to new azo dyes and to the process for manufacturing the same.

More particularly it relates to water-insoluble dyes free from sulfonic- and carboxylic acid groups which are particularly advantageous for dyeing cellulose esters, especially acetate silk.

Our new dyes are obtainable by diazotizing a nitro amino compound of the benzene series which may be substituted by alkyl, halogen or alkoxy, and coupling the diazo compound with a 1, 2, 3, 4-tetrahydroquinoline of the general formula

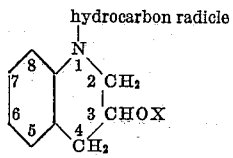

wherein X means hydrogen or alkyl and in which the benzene nucleus may be substituted by alkyl, halogen or alkoxy. These dyes being substituted in the 7-position of the azo component, are of particularly high value.

The new dyes have a surprising capacity for remaining in suspension and for being discharged white and are fast to acids. They dye tints which, as compared with those of the corresponding dyes having open chain, are shifted, in general, towards the blue side of the spectrum; moreover, in general, they have a better affinity and in many cases their dyeings have a better fastness to light and a greater stability to sulfur dioxide.

The following examples illustrate the invention, the parts being by weight:—

*Example 1.*—A diazo solution, made in the ordinary way from 13.8 parts of 4-nitro-1-aminobenzene, is run into a cold solution of 24 parts of 1-butyl-3-hydroxy-7-chlorotetrahydroquinoline in 20 parts of hydrochloric acid of 23° Bé. and 800 parts of water. To finish the coupling, the mixture is buffered with sodium acetate. The dye obtained yields on acetate silk a clear blue-red.

*Example 2.*—A diazo solution, made in the usual way from 17.3 parts of 4-nitro-2-chloro-1-aminobenzene, is run into a cold solution of 21.9 parts of 1-butyl-3-hydroxy-7-methyltetrahydroquinoline in 20 parts of hydrochloric acid of 23° Bé. and 800 parts of water and, for completing the coupling, the mixture is buffered with sodium acetate. The precipitated dye dyes acetate silk blue Bordeaux tints.

*Example 3.*—A diazo solution, made from 13.8 parts of 4-nitro-1-aminobenzene, is allowed to run into a cold solution of 23.9 parts of 1-benzyl-3-hydroxy-tetrahydroquinoline in 20 parts of hydrochloric acid of 23° Bé. and 800 parts of water and, for finishing the coupling, the mixture is buffered with sodium acetate. The dye dyes acetate silk clear red tints.

*Example 4.*—A diazo solution is made by stirring, at 25 to 30° C., 20.7 parts of 2,6-dichloro-1-amino-4-nitrobenzene into nitrosyl-sulfuric acid, made by introducing 7 parts of sodium nitrite into 130 parts of concentrated sulfuric acid, and the whole is then diluted strongly by pouring it upon ice. The filtered sulfuric acid diazo solution is run into a cold solution of 25.3 parts of 1-benzyl-3-hydroxy-7-methyltetrahydroquinoline in 800 parts of water and 20 parts of hydrochloric acid of 23° Bé. The mass is then buffered with caustic soda lye until coupling is completed. The dye dyes acetate silk bluish brown.

A similar dye having likewise good properties, is obtainable when substituting in the foregoing examples for 25.3 parts of 1-benzyl-3-hydroxy-7-methyl-tetrahydroquinoline the corresponding quantity of 1-butyl-3-hydroxy-7-methyl-tetrahydroquinoline.

*Example 5.*—A diazo solution, prepared in the usual manner by stirring 19 parts of 2,4-dinitro-1-amino-benzene into a nitrosyl-sulfuric acid, obtained by introducing 7 parts of sodium nitrite into 120 parts of sulfuric acid, is diluted by pouring it upon ice and then run into a weak hydrochloric acid solution of 19.2 parts of 1-ethyl-3-hydroxy-7-methyl-tetrahydroquinoline. The mass is then buffered with sodium acetate until the coupling is completed. The dye produces on acetate silk bluish-violet tints.

*Example 6.*—A diazo solution, made from 19 parts of 2,4-dinitro-1-aminobenzene, is run into a solution, cooled with ice, of 24 parts of 1-butyl-3-hydroxy-7-chloro-tetrahydroquinoline in the suitable quantity of dilute hydrochloric acid. The dye thus obtained, dyes acetate silk, when suspended in a soap bath, red violet tints.

*Example 7.*—26.2 parts of 6-bromo-2,4-dinitro-1-aminobenzene are diazotized and the diazo solution is run into a cold solution of 23 parts of 1-butyl-3-hydroxy-7-methyl-tetrahydroquinoline. The finished dye, when suitably dispersed, produces on acetate silk a clear reddish-blue.

*Example 8.*—A diazo solution, made from 24 parts of 6-chloro-2,4-dinitro-1-aminobenzene, is coupled with a solution of 27 parts of 1-benzyl-3-hydroxy-7-methyl-tetrahydroquinoline; the precipitated dye dyes acetate silk blue-violet.

*Example 9.*—26.2 parts of 6-bromo-2,4-dinitro-1-aminobenzene are diazotized in the usual manner and coupled in the manner described with 23 parts of 1-phenyl-3-hydroxy-tetrahydroquinoline. The dye, finished in the usual manner, dyes acetate silk when suspended in a soap bath reddish violet tints.

Example 10.—The diazo compound of 18.3 parts of 2,4-dinitro-1-aminobenzene is run into a solution cooled with ice of 24 parts of 1-butyl-3-hydroxy-8-methoxy-tetrahydroquinoline. A dye is obtained which dyes acetate silk red violet tints.

Example 11.—The diazo compound prepared from 18.3 parts of 2,4-dinitro-1-aminobenzene is coupled with 23.8 parts of 1-butyl-3-hydroxy-5,7-dimethyl-tetrahydroquinoline. The finished dye produces on acetate silk bluish-violet tints.

Example 12.—26.2 parts of 6-bromo-2,4-dinitro-1-aminobenzene are diazotized in the usual manner and the diazo compound is coupled with 27 parts of 1-butyl-3-hydroxy-5,7-dimethyl-8-methoxy-tetrahydroquinoline. The dye thus produced dyes acetate silk blue-violet tints.

Example 13.—The diazo compound mentioned in the foregoing example is coupled with 23.8 parts of 1-butyl-3-methoxy-7-methyl-tetrahydroquinoline. The dye produces on acetate silk clear reddish blue tints.

It is obvious that our invention is not limited to the foregoing examples or to the specific details given therein. We have enumerated a great number of nitranilines and halogen substituted nitranilines, which are suitable as diazo components. However, other substituents, likewise, may be present in the diazo component and thus we may use as diazo component, for instance, 6-alkoxy-2,4-dinitro-1-aminobenzenes, 6-alkyl-2,4-dinitro-1-aminobenzenes, 6-alkoxy-4-nitro-1-aminobenzenes and similar compounds.

All these possibilities are considered to be within the spirit of the invention and the scope of the following claims. In these claims the terms "nitro compound" and "nitraniline" are intended to cover all these substitution possibilities.

What we claim is:—

1. The dyes corresponding to the general formula—

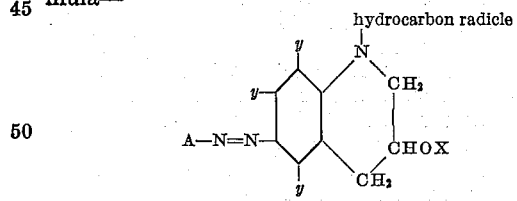

in which A is a radicle of a nitro compound of the benzene series, X is a member of the group consisting of hydrogen and alkyl and y is a member of the group consisting of hydrogen, alkyl, alkoxy and halogen, said dyes being insoluble in water and dyeing, suspended in a soap solution, acetate silk red to violet to blue to bluish brown tints of good fastness.

2. The dyes corresponding to the general formula—

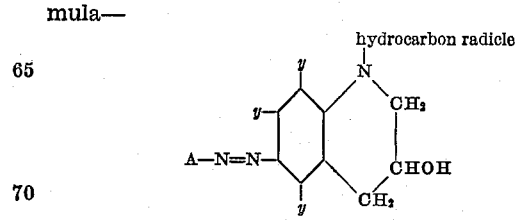

in which A is the radicle of a nitro compound of the benzene series and y is a member of the group consisting of hydrogen, alkyl, alkoxy and halogen, said dyes being insoluble in water and dyeing, suspended in a soap solution, acetate silk red to violet to blue to bluish brown tints of good fastness.

3. The dyes corresponding to the general formula—

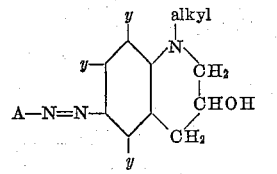

in which A is the radicle of a nitro compound of the benzene series and y is a member of the group consisting of hydrogen, alkyl, alkoxy and halogen, said dyes being insoluble in water and dyeing, suspended in a soap solution, acetate silk red to violet to blue tints to bluish brown tints of good fastness.

4. The dyes corresponding to the general formula—

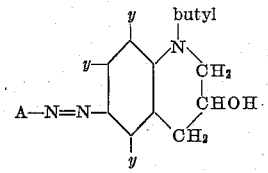

in which A is a radicle of a nitro compound of the benzene series and y is a member of the group consisting of hydrogen, alkyl, alkoxy and halogen, said dyes being insoluble in water and dyeing, suspended in a soap solution, acetate silk red to violet to blue tints to bluish brown tints of good fastness.

5. The dyes corresponding to the general formula—

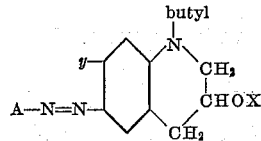

in which A is the radicle of a nitro compound of the benzene series, X is a member of the group consisting of hydrogen and alkyl and y is a member of the group consisting of alkyl, alkoxy and halogen, said dyes being insoluble in water and dyeing, suspended in a soap solution, acetate silk red to violet to blue tints to bluish brown tints of good fastness.

6. The dye which corresponds to the formula—

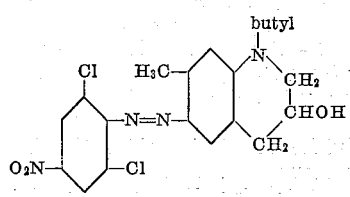

said dye being insoluble in water and dyeing, suspended in a soap solution, acetate silk bluish brown tints of good fastness.

7. The dye which corresponds to the formula—

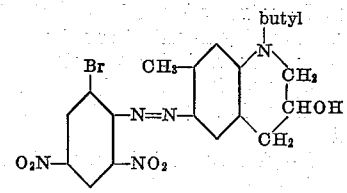

said dye being insoluble in water and dyeing, suspended in a soap solution, acetate silk red to violet to blue tints to bluish brown tints of good fastness.

8. The process which comprises diazotizing a nitraniline and coupling the diazo compound with a tetrahydroquinoline of the general formula—

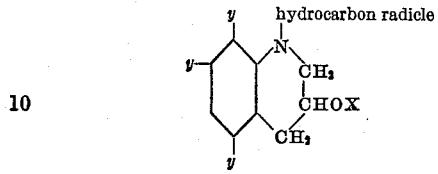

in which X is a member of the group consisting of hydrogen and alkyl and y is a member of the group consisting of hydrogen, alkyl, alkoxy and halogen.

9. The process which comprises diazotizing a nitraniline and coupling the diazo compound with a tetrahydroquinoline of the general formula—

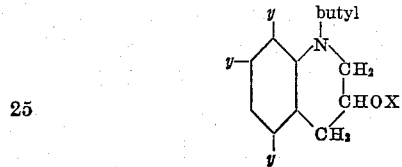

in which X is a member of the group consisting of hydrogen and alkyl and y is a member of the group consisting of hydrogen, alkyl, alkoxy and halogen.

10. The process which comprises diazotizing a nitraniline and coupling the diazo compound with a tetrahydroquinoline of the general formula—

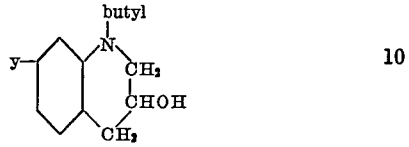

wherein y is a member of the group consisting of alkyl, alkoxy and halogen.

11. The process which comprises diazotizing 2,6-dichloro-1-amino-4-nitrobenzene and coupling the diazo compound with 1-butyl-3-hydroxy-7-methyl-1,2,3,4-tetrahydroquinoline.

12. The process which comprises diazotizing 6-bromo-2,4-dinitro-1-aminobenzene and coupling the diazo compound with 1-butyl-3-hydroxy-7-methyl-1,2,3,4-tetrahydroquinoline.

HEINRICH OHLENDORF.
ERICH BAUMANN.